(12) United States Patent
Zhang et al.

(10) Patent No.: US 8,297,574 B2
(45) Date of Patent: Oct. 30, 2012

(54) MOUNTING APPARATUS FOR DATA STORAGE DEVICE

(75) Inventors: Guang-Yi Zhang, Shenzhen (CN); Zhe Zhang, Shenzhen (CN); Jian Fu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 476 days.

(21) Appl. No.: 12/752,137

(22) Filed: Apr. 1, 2010

(65) Prior Publication Data

US 2011/0095151 A1    Apr. 28, 2011

(30) Foreign Application Priority Data

Oct. 26, 2009  (CN) .......................... 2009 1 0308788

(51) Int. Cl.
| | |
|---|---|
| A47B 96/00 | (2006.01) |
| A47K 1/00 | (2006.01) |
| A47K 5/00 | (2006.01) |
| E04G 5/06 | (2006.01) |
| F16L 3/08 | (2006.01) |
| F21V 35/00 | (2006.01) |
| G12B 9/00 | (2006.01) |

(52) U.S. Cl. .................. 248/221.11; 248/649; 248/27.1; 248/27.3; 248/224.7; 248/222.11; 312/223.1; 312/223.2; 361/724; 361/725; 361/726; 361/679.02; 361/679.31; 361/679.33; 361/679.37

(58) Field of Classification Search .................. 248/649, 248/221.11, 27.1, 27.3, 224.7, 222.11; 312/223.1, 312/223.2; 361/724–726, 679.02, 679–687, 361/679.31, 679.33, 679.37
See application file for complete search history.

(56) References Cited

U.S. PATENT DOCUMENTS

| | | | | |
|---|---|---|---|---|
| 6,490,153 | B1 * | 12/2002 | Casebolt et al. | 361/679.33 |
| 7,072,177 | B2 * | 7/2006 | Peng et al. | 361/679.33 |
| 7,254,017 | B2 * | 8/2007 | Peng et al. | 361/679.33 |
| 7,782,606 | B2 * | 8/2010 | Baker et al. | 361/679.39 |
| 8,009,416 | B2 * | 8/2011 | Kang | 361/679.38 |
| 8,009,425 | B2 * | 8/2011 | Kang | 361/679.58 |
| 8,023,263 | B2 * | 9/2011 | Crippen et al. | 361/679.58 |
| 8,118,271 | B2 * | 2/2012 | Peng et al. | 248/222.11 |
| 8,220,756 | B2 * | 7/2012 | Peng et al. | 248/27.1 |
| 2005/0007734 | A1 * | 1/2005 | Peng et al. | 361/685 |
| 2005/0024819 | A1 * | 2/2005 | Peng et al. | 361/685 |
| 2010/0294905 | A1 * | 11/2010 | Peng et al. | 248/222.12 |
| 2010/0302722 | A1 * | 12/2010 | Kang | 361/679.31 |
| 2011/0001031 | A1 * | 1/2011 | Peng et al. | 248/316.7 |

* cited by examiner

*Primary Examiner* — Terrell McKinnon
*Assistant Examiner* — Christopher Garft
(74) *Attorney, Agent, or Firm* — Altis Law Group, Inc.

(57) ABSTRACT

A mounting apparatus includes a bracket defining a clamping hole, a receiving rack, a connecting member fixed to the receiving rack, a receiving member fixed to the connecting member, and a latching unit. The latching unit includes a pivoting member pivotably mounted to the receiving member, a first resilient member, a second resilient member, a rotating member pivotably mounted to the pivoting member, a contact member abutting against the rotating member, and a hooking member clamped to the rotating member. The contact member and the hooking member are slidably mounted to opposite ends of the pivoting member, respectively, and can be moved towards each other. The first resilient member resists against the pivoting member and the hooking member to return the hooking member back. The second member resists against the pivoting member and the contact member to return the contact member back.

19 Claims, 7 Drawing Sheets

MOUNTING APPARATUS FOR DATA STORAGE DEVICE

BACKGROUND

1. Technical Field

The disclosure relates to mounting apparatuses for data storage devices, and particularly to a mounting apparatus that readily secures data storage devices in a computer enclosure.

2. Description of Related Art

Generally speaking, when a computer is assembled, a bracket is mounted in a computer enclosure, to which data storage devices will be attached, often by screws. This methodology can be tedious and time-consuming. Moreover, in this process, one or more screws can easily fall into the crowded interior of the computer enclosure, thus requiring a difficult retrieval.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 6:
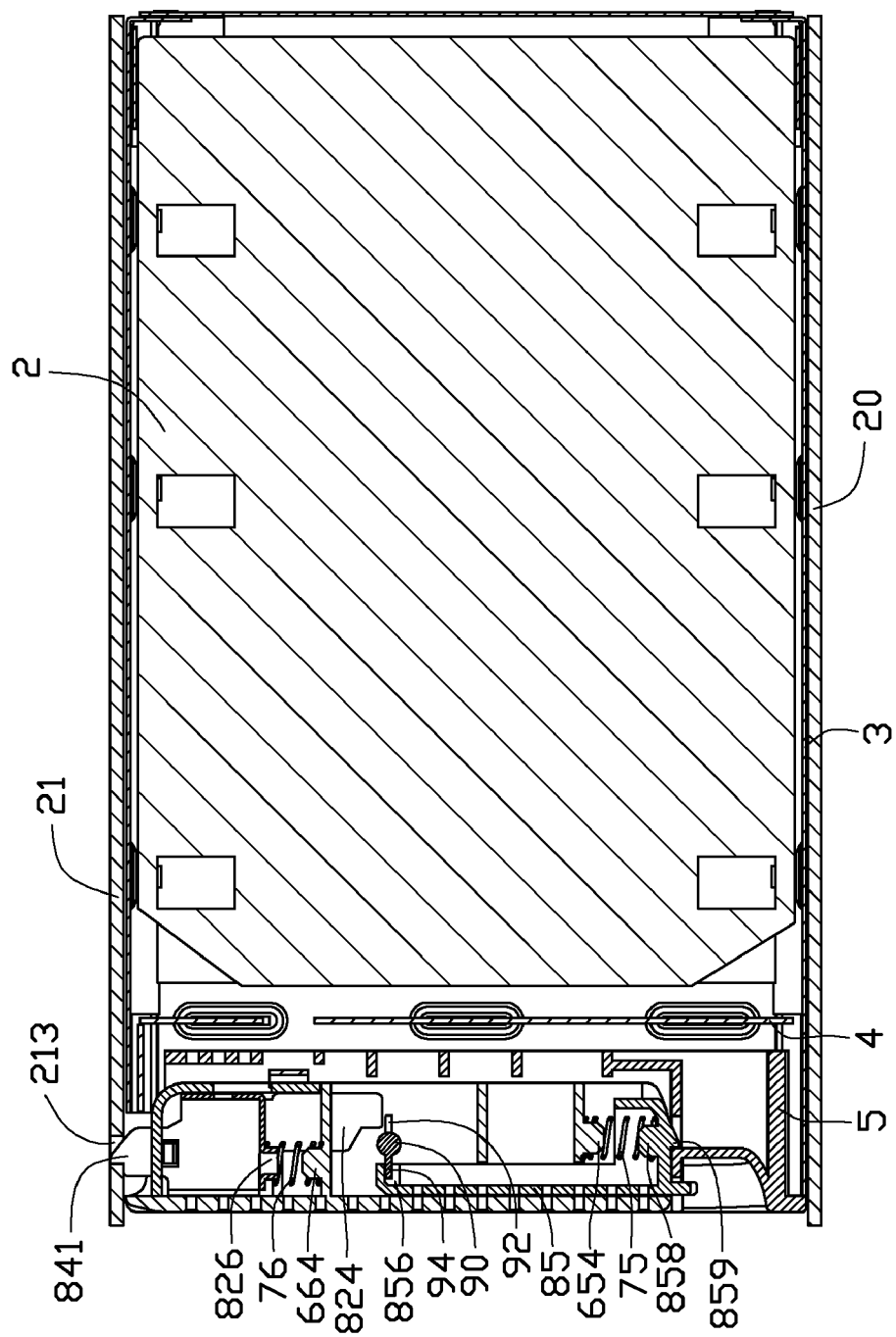
FIG. 6 is a cross-section of FIG. 5, taken along the line VI-VI.

Referring to FIG. 6, an exemplary embodiment of a mounting apparatus is provided to fix a data storage device 2 to a bracket 20 fixed in a computer (not shown). The bracket 20 includes a sidewall 21 defining two aligned clamping holes 213

Figure 1:
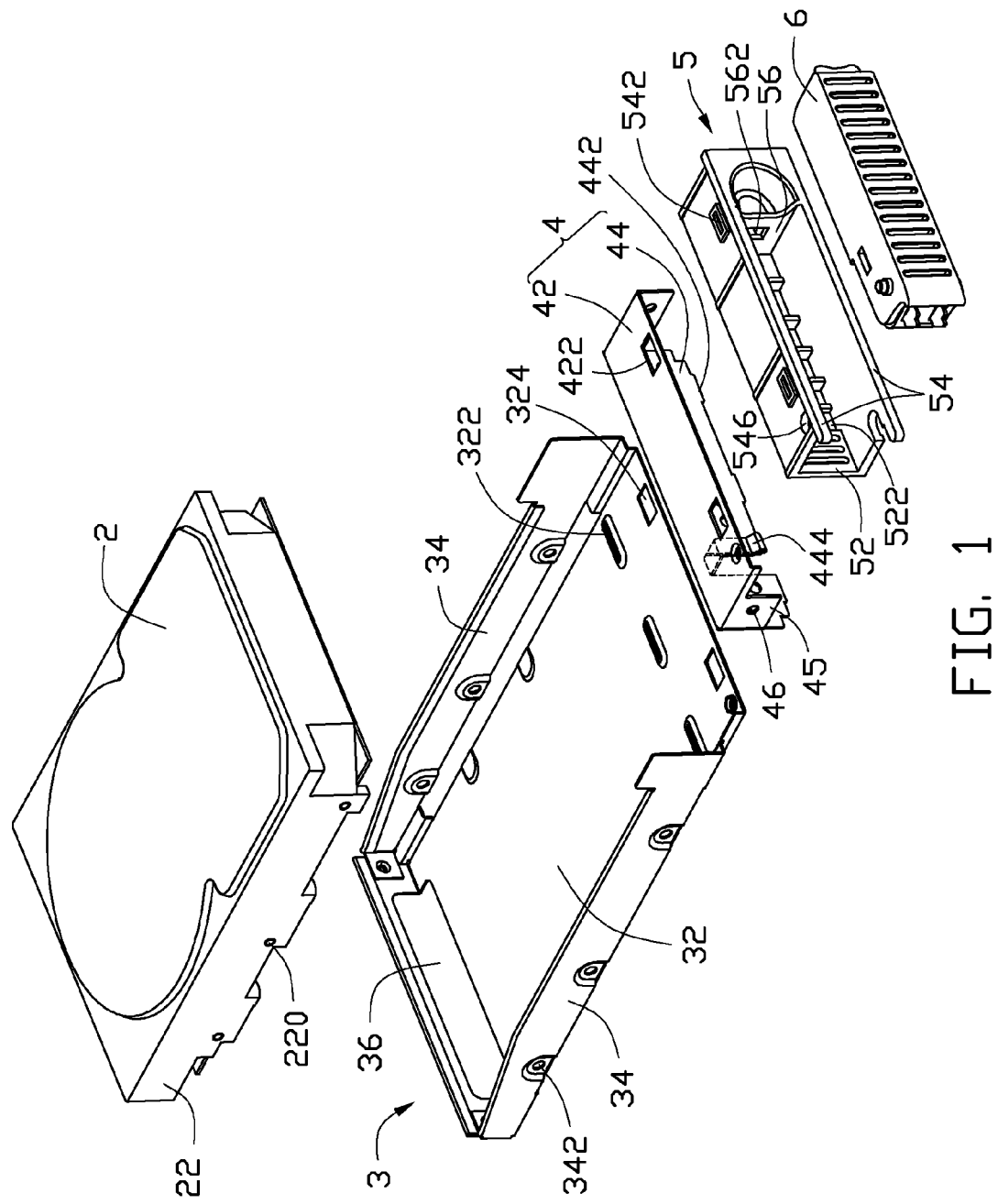
FIG. 1 is an exploded, isometric view of an exemplary embodiment of a mounting apparatus together with a data storage device, the mounting apparatus includes a latching unit.

Referring to FIG. 1, the mounting apparatus includes a receiving rack 3 for receiving the data storage device 2, a connecting member 4 fixed to the receiving rack 3, a receiving member 5, and a latching unit 6 pivotably mounted to the receiving member 5.

The data storage device 2 includes opposite sides 22, each side 22 defines a plurality of fixing holes 220.

The receiving rack 3 includes a bottom plate 32, opposite side plates 34 perpendicularly extending from opposite sides of the bottom plate 32, and a rear plate 36 connecting rear ends of the side plates 34 for resisting against a rear side of the data storage device 2. The bottom plate 32 defines a plurality of clamping slots 322 arranged in a line, adjacent to a front end of the bottom plate 32, and two mounting holes 324 at front of the clamping slots 322. The side plates 34 are configured for connecting to the sidewalls 22 of the data storage device 2, to sandwich the data storage device 2 between the two side plates 34, each side plate 34 defines a plurality of fixing holes 342.

The connecting member 4 includes a top plate 42, and a resisting plate 44 perpendicularly extending downward from the top plate 42. The top plate 42 defines two mounting holes 422. A plurality of clamping blocks 442 separately extending from a bottom edge of the resisting plate 44 opposite to the top plate 42. A resilient tab 444 extends perpendicularly from the resisting plate 44, and then slants downward, to form a generally inverted L-shape. Two opposite flanges 45 each defining a fastening hole 46 perpendicularly extend from opposite ends of the resisting plate 44, perpendicularly connected to the top plate 42.

The receiving member 5 includes a side panel 52, two fixing plates 54 perpendicularly extending from opposite sides of the side panel 52, and a connecting plate 56 perpendicularly connected among the fixing plates 54 and the side panel 52. The side panel 52 defines a through hole 522, for the resilient tab 444 extending through the through hole 522. Two locking protrusions 542 protrude from each fixing plate 54. Each fixing plate 54 defines a pivot hole 546, away from the connecting plate 56, wherein one of the pivot holes 546 extends through an end of one of the fixing plates 54, to form a cutout (not labeled). A matching slot 562 is defined in the connecting plate 56.

Figure 2:
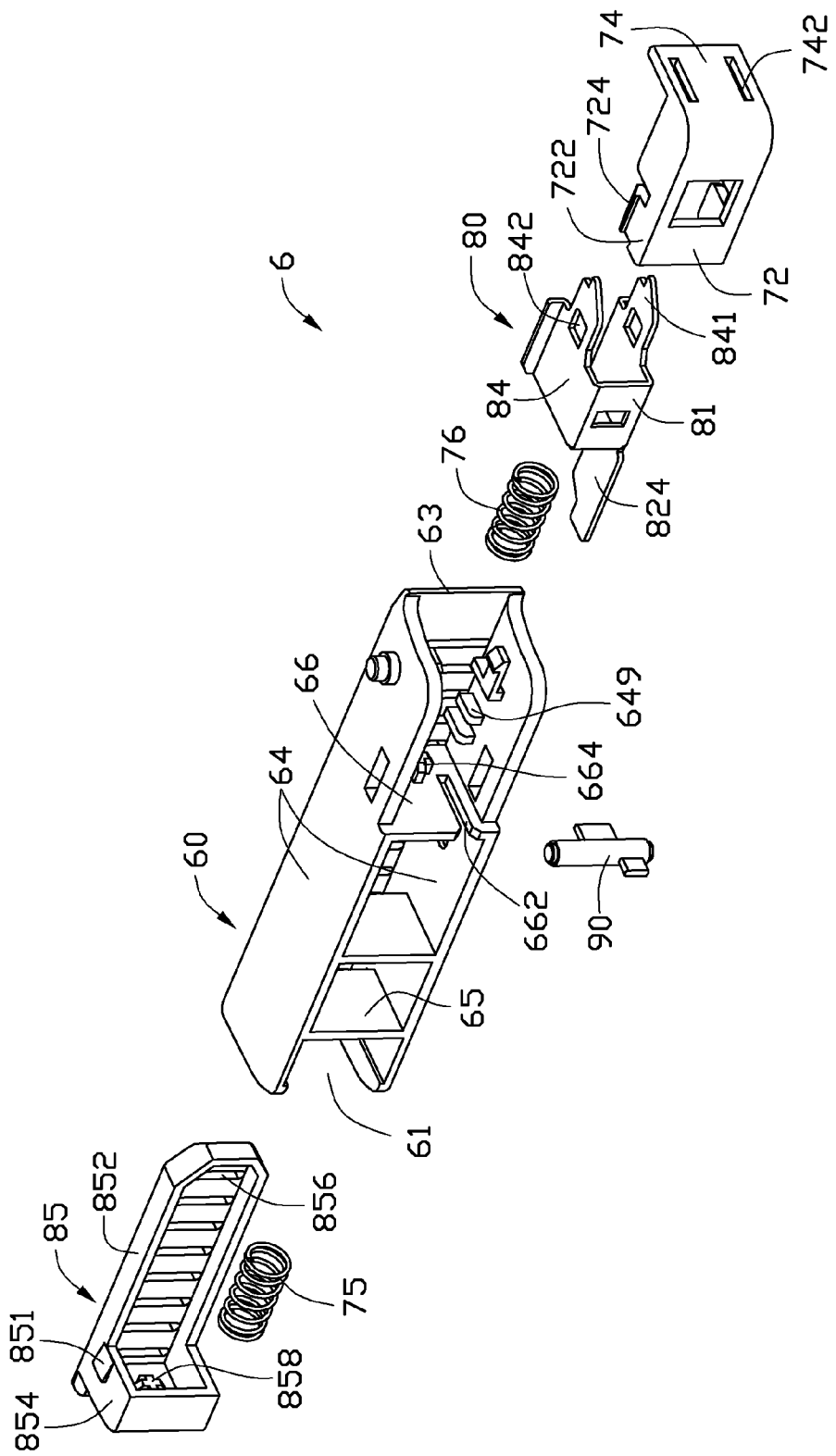
FIG. 2 is an exploded, isometric view of the latching unit of FIG. 1.
Figure 3:
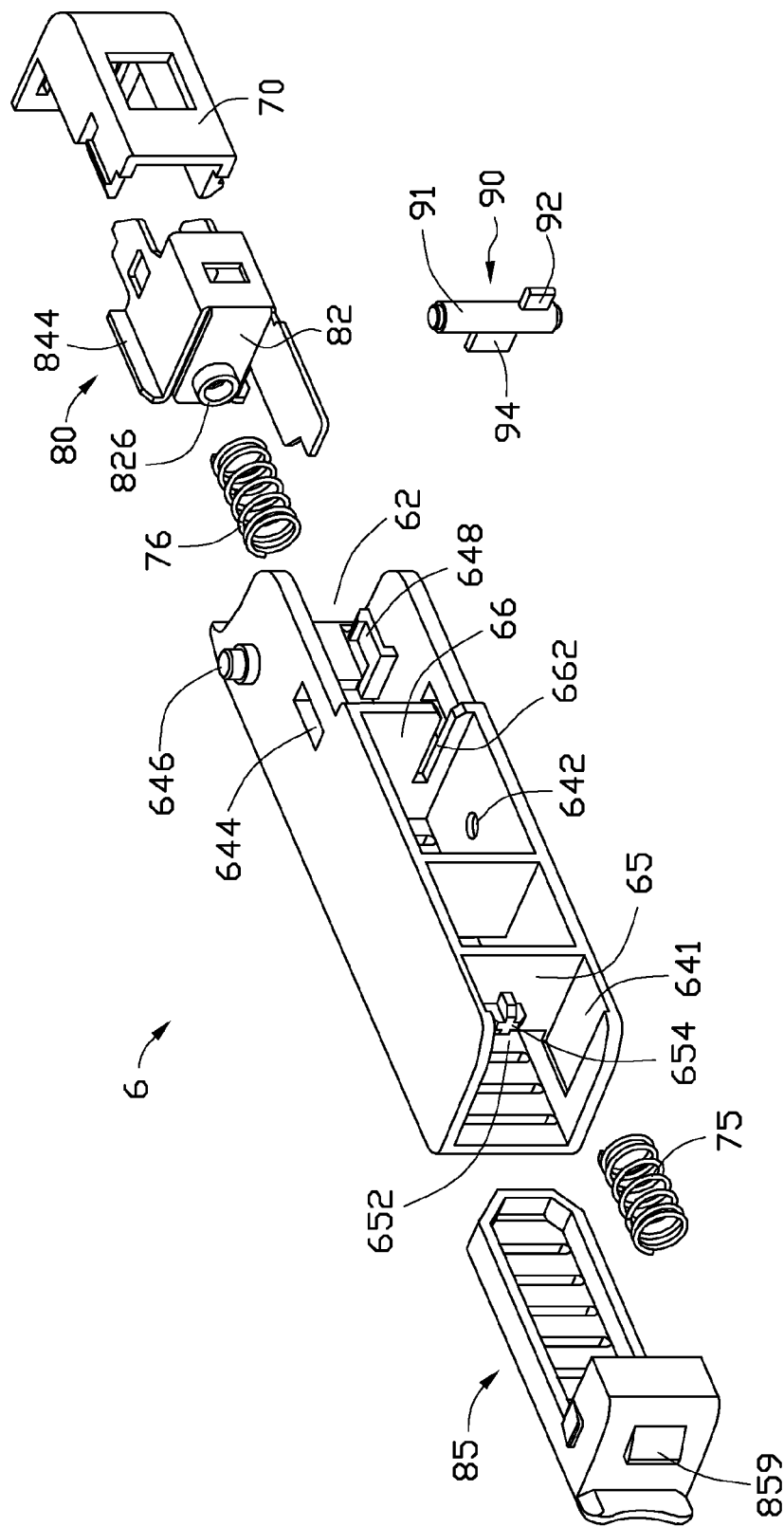
FIG. 3 is similar to FIG. 2, but viewed from another perspective.

Referring to FIGS. 2 and 3, the latching unit 6 includes a pivoting member 60, a positioning member 70, a first resilient member 75, a second resilient member 76, a contact member 80, a hooking member 85, and a rotating member 90. In this embodiment, the first and the second resilient members 75 and 76 are coil springs.

The pivoting member 60 includes a blocking plate 63, and two securing panels 64 perpendicularly extending from opposite sides of the blocking plate 63. Two connecting boards 65 and a positioning board 66 are perpendicularly connected between the securing panels 64, perpendicular to the blocking plate 63. Hence, a receiving groove 61 is defined in a first end of the pivoting member 60, bounded by the blocking plate 63, the securing panels 64, and one of the connecting boards 65 adjacent to the first end of the pivoting member 60. A fixing groove 62 is defined in a second end of the pivoting member 60, opposite to the first end of the pivoting member 60 and bounded by the blocking plate 63, the securing panels 64, and the positioning board 66. The connecting boards 65 each define a through hole 652, abutting the blocking plate 63. A fixing post 654 extends into the receiving groove 61 from the corresponding connecting board 65 bounding the receiving groove 61. Inner sides of the securing panels 64 facing the receiving groove 61 each define a depressed portion 641, correspondingly. Two fixing slots 642 are defined in the inner sides of the securing panels 64, between the connecting board 65 adjacent to the positioning board 66 and the positioning board 66. The positioning board 66 defines a cutout 662 in a lower part of the positioning board 66, communicating with the fixing groove 62. A fixing post 664 extends into the fixing groove 62 from the positioning board 66. The securing panels 64 each define a fixing hole 644, communicating with the fixing groove 62. Two fixing shafts 646 extend outward from the securing panels 64, correspondingly, neighboring the fixing groove 62. The clamping hooks 648 extend from the inner sides of the securing panels 64, and are sequentially situated in the fixing groove 62, and spaced from the blocking plate 63. Additionally, a plurality of supporting blocks 649 neighboring the corresponding clamping hooks 648 extend from the inner side of each securing panel 64, for support the contact member 80.

The contact member 80 includes a sidewall 81, two resisting walls 84 perpendicularly extending from opposite sides of the sidewall 81, and a connecting wall 82 perpendicularly connecting the resisting walls 84 and the sidewall 81. Two flanges 844 opposite to each other perpendicularly extend from distal sides of the resisting walls 84, away from the sidewall 81. A latching tab 841 having slanted distal end extends from a side of each resisting wall 84, away from the connecting wall 82. Two through slots 842 are defined in the latching tabs 841 neighboring the corresponding resisting walls 84, respectively. A rod 824 extends from one of the resisting walls 84, opposite to the latching tabs 841. A fixing post 826 extends from the connecting wall 82, facing the rod 824.

The positioning member 70 includes a main board 72, and an end board 74 extending from a first end of the main board 72. The end board 74 defines two through holes 742, through which the latching tabs 841 of the contact member 80 pass. Two side boards 722 perpendicularly extend from opposite sides of the main board 72, respectively. A clamp 724 extends from a distal side of each side board 722, away from the main board 72 and adjacent to a second end of the main board 72 opposite to the first end of the main board 72.

The hooking member 85 is generally L-shaped. The hooking member 85 includes a slide body 852, and a clasping portion 854 perpendicularly extending from a first end of the slide body 852. A clamping ditch 856 is defined in a second end of the slide body 852, away from the clasping portion 854. A fixing post 858 extends from an inner surface of the clasping portion 854, facing the clamping ditch 856. A wedged-shaped locking block 859 protrudes from an outer surface of the clasping portion 854, opposite to the fixing post 858. Two wedged-shaped resisting blocks 851 protrude from opposite sidewalls of the clasping portion 854, correspondingly.

The rotating member 90 has a cylinder shaped body 91. A pushing tab 92 and a fixing tab 94 opposite to the pushing tab 92 extend from a middle portion of a circumference of the body 91.

Figure 4:
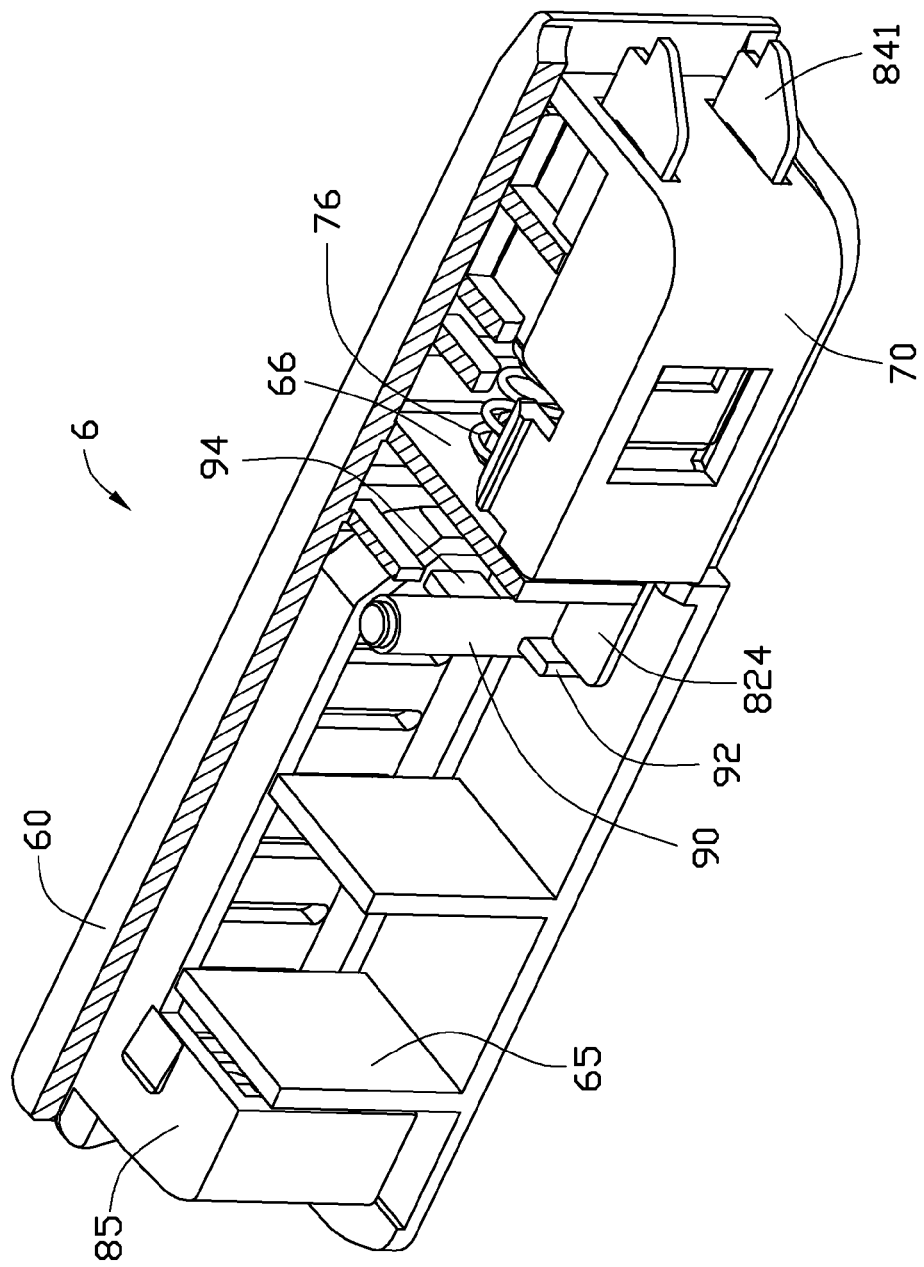
FIG. 4 is an assembled, isometric view of the latching unit of FIG. 2, but partly cutaway.

Referring to FIG. 4, in assembly of the latching unit 6, a first end of the first resilient member 75 is fitted about the fixing post 654 of the pivoting member 60. The slide body 852 of the hooking member 85 is extended through the through holes 652 of the connecting boards 65, with a second end of the first resilient member 75 fitting about the fixing post 858 of the hooking member 85. Therefore, the clasping portion 854 of the hooking member 85 is received in the receiving groove 61, and the resisting blocks 851 are slidably received in the depressed portions 641 of the pivoting member 60. So the resisting blocks 851 can slidably resist against sidewalls of the depressed portions 641, to prevent the hooking member 85 from disengaging from the pivoting member 60. Opposite ends of the rotating member 90 are pivotably engaged in the fixing slots 642 of the pivoting member 60, respectively, with the fixing tab 94 of the rotating member 90 engaged in the clamping ditch 856 of the hooking member 85.

The contact member 80 is received in the positioning member 70, with the resisting walls 84 abutting against the side boards 722. Therefore, the latching tabs 841 of the contact member 80 pass through the through holes 742 of the positioning member 70, respectively. A first end of the second resilient member 76 is fitted about the fixing post 826 of the contact member 80, and then the contact member 80 is pushed into the fixing groove 62 of the pivoting member 60. Together with the positioning member 70, with a second end of the second resilient member 76 fitting about the fixing post 664 of the pivoting member 60. The rod 824 of the contact member 80 is extended through the cutout 662 of the pivoting member 60, to abut against the pushing tab 92 of the rotating member 90. The flanges 844 of the contact member 80 are received in the fixing groove 62 of the pivoting member 60, between the clamping hooks 648 and the blocking plate 63 of the pivoting member 60, with the clamping hooks 648 of the pivoting member 60 slidably engaged in the corresponding through slots 842 of the contact member 80. The side boards 722 of the positioning member 70 resist against the securing panels 64 of the pivoting member 60, respectively, with the clamps 724 of the positioning member 70 engaged in the fixing holes 644 of the pivoting member 60, to retain the positioning member 70 in the pivoting member 60.

Figure 5:
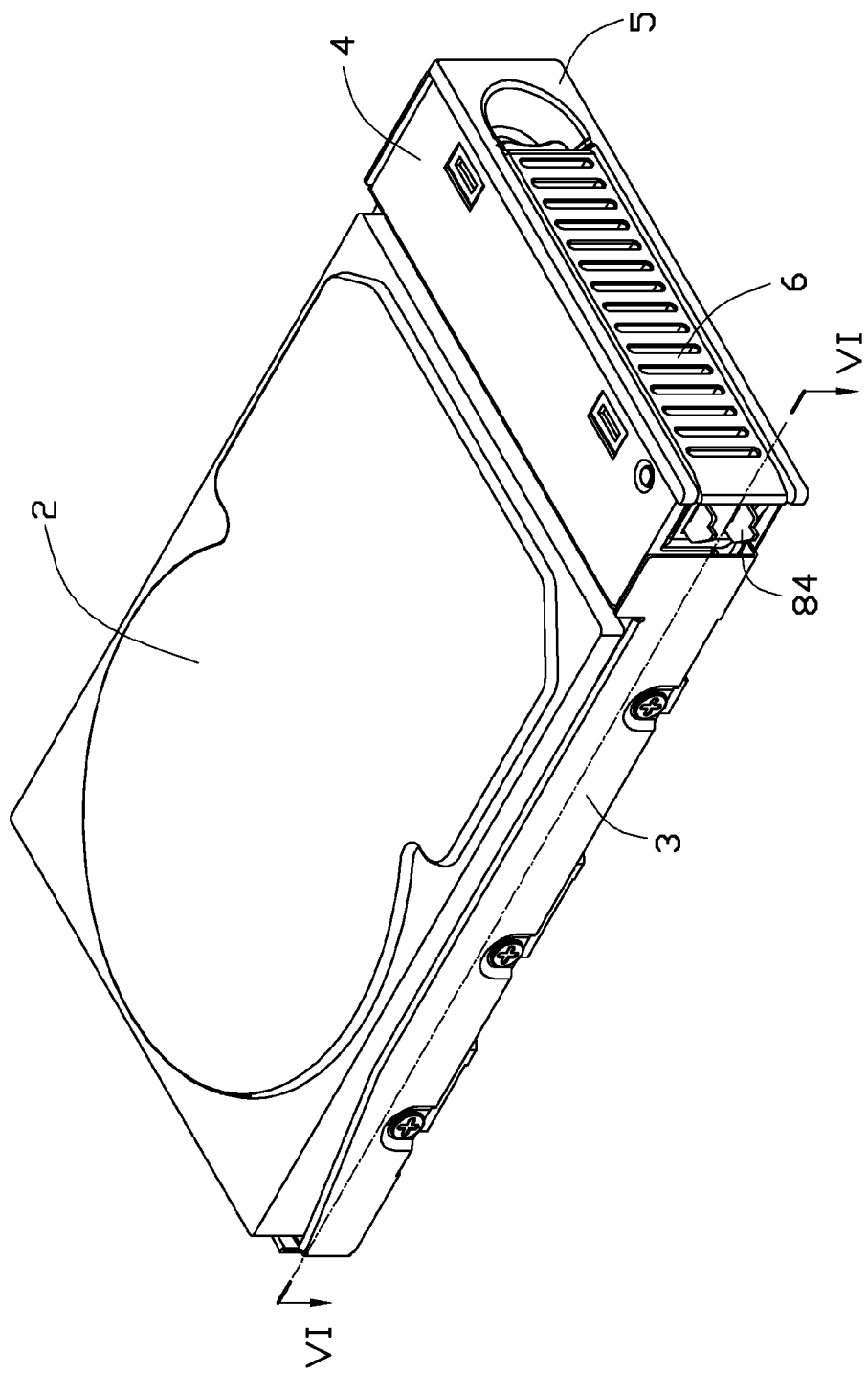
FIG. 5 is an assembled, isometric view of the mounting apparatus of FIG. 1.

Referring to FIGS. 1 and 5, during assembly of the data storage device 2, the fixing shafts 646 of the pivoting member 60 of the latching unit 60 are engaged in the pivot hole 546 of the receiving member 5, such that the latching unit 60 is pivotably mounted to the receiving member 5. The latching unit 60 is pivoted towards the receiving member 5. The locking block 859 of the hooking member 85 of the latching unit 60 resists against the connecting plate 56 of the receiving member 5 deforming the first resilient member 75. When the latching unit 6 is completely sandwiched between the fixing plates 54 of the receiving member 5, the first resilient member 75 restores to move the locking block 859 to engage in the matching slot 562 of the receiving member 5. The connecting member 4 is covered onto the receiving member 5, with the locking protrusions 542 of one of the corresponding fixing plates 54 of the receiving member 5 engaged in the mounting holes 422 of the connecting member 4. Therefore, the receiving member 5 is fixed to the connecting member 4. The resilient tab 444 of the connecting member 4 is passed through the through hole 522 of the receiving member 5, and then elastically resists against the main board 72 of the positioning member 70. The data storage device 2 is received in receiving rack 3, and then fixed to the side plates 34 of the receiving rack 3 via fasteners extending through the plurality of fixing holes 342 of the side plates 34 of the receiving rack 3 to engage in the plurality of fixing holes 220 of the data storage device 2. The clamping blocks 442 of the connecting member 4 are engaged in the clamping slots 322 of the receiving rack 3, and the locking protrusions 542 of the other fixing plate 54 of the receiving member 5 are engaged in the mounting holes 324 of the receiving rack 3. In addition, two screws (not shown) can be passed through the fastening holes 46 of the connecting member 4 to engage in the side plates 34 of the receiving rack 3. Therefore, the connecting member 4 is fixed to the receiving rack 3, together with the receiving member 5 and the latching unit 6. Obviously, a plurality of bolts (not shown) can be used to fix the connecting member 4 to the receiving rack 3 in other embodiments.

Figure 7:
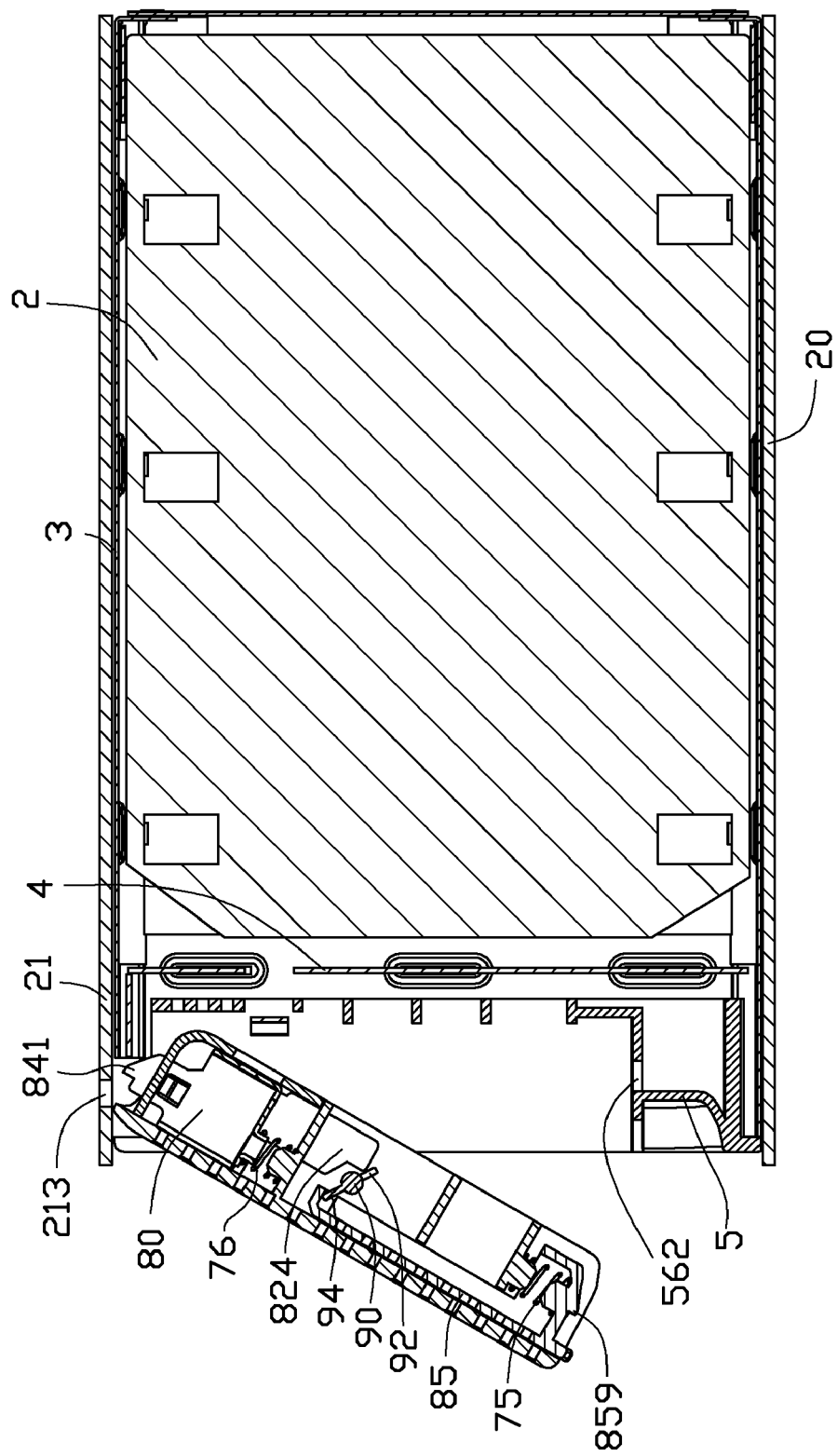
FIG. 7 is similar to FIG. 6, but shows the latching unit pivotably rotated away from the data storage device.

Referring to FIGS. 6 and 7, in use, the receiving rack 3 is moved into the bracket 20, together with the data storage device 2. The contact member 80 of the latching unit 6 is moved inward in response to the latching tabs 841 of the contact member 80 resist against the sidewall 21 of the bracket 20. Therefore, the second resilient member 76 deforms. The rod 824 of the contact member 80 resists against the pushing tab 92 of the rotating member 90 to rotate the rotating member 90. Therefore, the hooking member 85 of the latching unit 6 is moved away from the connecting plate 56 of the receiving member 5, to deform the first resilient member 75, resulting in the locking block 859 of the hooking member 85 disengaging from the matching slot 562 of the receiving member 5. When the latching tabs 841 of the contact member 80 are aligned with the clamping holes 213 of the bracket 20, the elasticity of the second resilient member 76 moves the contact member 80 towards the sidewall 21, with the latching tabs 841 engaged in the clamping holes 213. As a result, the elasticity of the first resilient member 75 moves the hooking member 85 towards the connecting plate 56, with the locking block 859 engaged in the matching slot 562 of the connecting plate 56. Therefore, together with the data storage device 2, the receiving rack 30 is fixed to the bracket 20. The deformation of the first and second resilient members 75 and 76 can compensate the deviation of the bracket 20 due to vibration or manufacture errors of the bracket 20.

In addition, if the latching tabs 841 of the contact member 80 do not engage in the clamping holes 213 of the bracket 20 but resist against the sidewall 21 of the bracket 20, the rod 841 of the contact member 80 moves to push the pushing tab 92. Therefore, the hooking member 85 moves towards the contact member 80, with the locking block 859 of the hooking member 85 disengaging from the matching slot 562 of the connecting plate 56. The elasticity of the resilient tab 444 of the connecting member 4 forces the positioning member 70 of the latching unit 6 to pivot away from the receiving member 5, which will alarm users that the data storage device 10 is not fixed to the bracket 20 in position.

In other embodiments, the positioning member 70 of the latching unit 6 may be omitted. Therefore, the elastic tab 444 of the connecting member 4 directly resists against the sidewall 81 of the contact member 80 of the latching unit 6.

Obviously, the contact member 80 of the latching unit 6 can include one latching tab 841 or a plurality of latching tabs 841. Therefore, the sidewall 21 of the bracket 20 can define one clamping hole 213 or a plurality of clamping holes 213, corresponding to the one latching tab 841 or the plurality of latching tabs 841.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A mounting apparatus for mounting a data storage device, the mounting apparatus comprising:
    a bracket comprising a sidewall defining at least one clamping hole;
    a receiving rack to receive the data storage device;
    a connecting member fixed to the receiving rack;
    a receiving member fixed to the connecting member; and
    a latching unit comprising a pivoting member, a first resilient member, a second resilient member, a rotating member pivotably mounted to the pivoting member, a contact member abutting against the rotating member, and a hooking member clamped to the rotating member, wherein a first end of the pivoting member is pivotably mounted to the receiving member, the contact member and the hooking member are slidably mounted to the first end and a second end opposite to the first end of the pivoting member, respectively, the first resilient member resists against the pivoting member and the hooking member, the second member resists against the pivoting member and the contact member;
    wherein when the contact member is moved away from the at least one clamping hole of the bracket and engages with the sidewall of the bracket, the second resilient member is deformed and the rotating member is rotated to drive the hooking member to move towards the contact member, with the first resilient member deformed; when the contact member is moved in alignment with the at least one clamping hole, elasticity of the first and second resilient members are operable of moving the contact member and the hooking member away from each other, to move the contact member to engage in the at least one clamping hole.

2. The mounting apparatus of claim 1, wherein the rotating member comprises a cylinder shaped body, and a pushing tab and a fixing tab opposite to the pushing tab extending from a middle of a circumference of the body, the pushing tab abuts against the contact member, and the fixing tab is clamped in the hooking member.

3. The mounting apparatus of claim 2, wherein the pivoting member defines a receiving groove for slidably receiving the hooking member, the hooking member comprises a slide body defining a clamping ditch therein, the fixing tab of the rotating member is engaged in the clamping ditch.

4. The mounting apparatus of claim 3, wherein the hooking member further comprises a clasping portion perpendicularly extending from the slide body opposite to the clamping ditch, a fixing post extends from the clasping portion, the pivoting member comprises a connecting board bounding the receiving groove, and a fixing post extending into the receiving groove from the connecting board, opposite ends of the first resilient member fit about the fixing posts of the hooking member and the pivoting member, correspondingly.

5. The mounting apparatus of claim 4, wherein a wedged-shaped locking block protrudes from the clasping portion, opposite to the fixing post of the hooking member, the receiving member comprises a connecting plate defining a matching slot, the locking block is operable of engaging in the matching slot, in response to the contact member being engaged in the at least one clamping hole of the bracket.

6. The mounting apparatus of claim 4, wherein the pivoting member comprises a blocking plate, and two securing panels extending from opposite sides of the blocking plate, the connecting board is perpendicularly formed among the securing panels and the blocking plate, the connecting board defines a through hole abutting the blocking plate, for the slide body of the hooking member slidably extending through the through hole.

7. The mounting apparatus of claim 6, wherein each securing panel defines a fixing slot, opposite ends of the rotating member are pivotably engaged in the fixing slots, respectively.

8. The mounting apparatus of claim 2, wherein the pivoting member comprises a blocking plate, and two securing panels extending from opposite sides of the blocking plate, a positioning board is perpendicularly formed among the securing panels and the blocking plate to bound a fixing groove in an end of the pivoting member, the positioning board defines a cutout, the contact member comprises a rod extending through the cutout to abut against the pushing tab of the rotating member.

9. The mounting apparatus of claim 8, wherein the contact member further comprises a connecting wall, the rod perpendicularly extends from the connecting wall, and a fixing post also extends from the connecting wall facing the rod, a fixing post extends into the fixing groove from the positioning board, opposite ends of the second resilient member fit about the fixing posts of the positioning board and the connecting wall, correspondingly.

10. The mounting apparatus of claim 1, wherein the receiving member comprises a side panel, two fixing plates extending from opposite sides of the side panel, each fixing plate defines a pivot hole, the pivoting member is mounted between the fixing plates, and comprises two fixing shafts pivotably engaged in the pivot holes, respectively.

11. The mounting apparatus of claim 1, wherein the receiving member defines a through hole, the connecting member comprises a resilient tab, the resilient tab is passed through the through hole, to elastically drive the latching unit to pivot away from the receiving member.

12. A mounting apparatus for mounting a data storage device, the mounting apparatus comprising:
- a bracket comprising a sidewall defining at least one clamping hole;
- a receiving rack to receive the data storage device;
- a connecting member fixed to the receiving rack, and comprising a resilient tab extending out of the receiving rack;
- a latching unit; and
- a receiving member fixed to the connecting member, and defining a through hole for the resilient tab passing therethrough to resist against the latching unit, the receiving member comprising a connecting plate defining a matching slot;
- wherein the latching unit comprises a pivoting member, a first resilient member, a second resilient member, a rotating member pivotably mounted to the pivoting member, a contact member abutting against the rotating member, and a hooking member clamped to the rotating member; the pivoting member is pivotably mounted to one end of the receiving member, away from the connecting plate, the contact member and the hooking member are slidably mounted to opposite ends of the pivoting member, respectively, with the hooking member being operable of engaging in the matching slot, the first resilient member resists against the pivoting member and the hooking member, the second resilient member resists against the pivoting member and the contact member;
- wherein when the contact member is moved to resist against the sidewall of the bracket to deform the second resilient member, the rotating member is rotated, resulting in the hooking member moving towards the contact member to disengage from the matching slot, with the first resilient member deformed, as the meanwhile, elasticity of the resilient tab drives the latching unit to pivot away from the receiving member; wherein when the contact member is moved to engage in the at least one clamping hole, elasticity of the first and second resilient members move the contact member and the hooking member away from each other.

13. The mounting apparatus of claim 12, wherein the receiving member comprises a side panel, two fixing plates extending from opposite sides of the side panel, the through hole is defined in the side panel, the connecting plate is formed between the fixing plates, each fixing plate defines a pivot hole, the pivoting member is mounted between the fixing plates, and comprises two fixing shafts pivotably engaged in the pivot holes, respectively.

14. The mounting apparatus of claim 12, wherein the pivoting member comprises a blocking plate, and two securing panels extending from opposite sides of the blocking plate, two connecting boards are perpendicularly formed between the securing panels, each connecting board defines a through hole abutting the blocking plate, the hooking member comprises a slide body slidably extending through the through holes.

15. The mounting apparatus of claim 14, wherein the slide body defines a clamping ditch, opposite ends of the rotating member pivotably mounted to the securing panels, correspondingly, the rotating member comprises a fixing tab engaged in the clamping ditch.

16. The mounting apparatus of claim 15, wherein the pivoting member further comprises a positioning board perpendicularly formed between the securing panels, the positioning board defines a cutout, the rotating member further comprises a pushing tab opposite to the fixing tab, the contact member comprises a rod extending through the cutout to abut against the pushing tab.

17. The mounting apparatus of claim 16, wherein the contact member further comprises a connecting wall, the rod perpendicularly extends from the connecting wall, the second resilient member is mounted between the positioning board and the connecting wall, with opposite ends of the second resilient member resisting against the positioning board and the connecting wall, correspondingly.

18. The mounting apparatus of claim 14, wherein the hooking member further comprises a clasping portion perpendicularly extending from the slide body, the first resilient member is mounted between the clasping portion and a corresponding connecting board, with opposite ends of the second resilient member resisting against the clasping portion and the connecting board, correspondingly.

19. The mounting apparatus of claim 18, wherein a wedged-shaped locking block protrudes from the clasping portion, opposite to the corresponding connecting board, the contact member comprises at least one latching tab, the locking block is operable of engaging in the matching slot, in response to the at least one latching tab of the contact member being engaged in the at least one clamping hole of the bracket.

* * * * *